United States Patent [19]

Tanaka et al.

[11] 4,453,953
[45] Jun. 12, 1984

[54] INTERMITTENT OZONE FEEDING APPARATUS

[75] Inventors: Masaaki Tanaka; Shiro Yamauchi; Shigeki Nakayama, all of Amagasaki, Japan

[73] Assignee: Mitsubishi Denki Kabushiki Kaisha, Amagasaki, Japan

[21] Appl. No.: 324,423

[22] Filed: Nov. 24, 1981

[30] Foreign Application Priority Data

| May 12, 1981 | [JP] | Japan | 56/71057[U] |
| May 12, 1981 | [JP] | Japan | 56/71058 |
| May 12, 1981 | [JP] | Japan | 56/71059 |
| May 18, 1981 | [JP] | Japan | 56/71803[U] |

[51] Int. Cl.$^3$ .......................................... B01D 53/04
[52] U.S. Cl. ...................................... 55/163; 55/189; 55/387
[58] Field of Search ............... 210/760, 90, 97, 130, 210/136, 137, 192; 422/186.08, 186.09, 186.11, 186.12, 905; 423/581; 55/58, 74, 163, 180, 189, 387

[56] References Cited

U.S. PATENT DOCUMENTS

| 2,043,701 | 6/1936 | Hartman | 422/186.08 |
| 2,872,397 | 2/1959 | Kiffer | 422/186.11 |
| 3,812,816 | 5/1974 | Juhasz | 210/90 |
| 4,053,398 | 10/1977 | Venema | 210/689 |
| 4,136,027 | 1/1979 | Sakamoto et al. | 210/760 |

Primary Examiner—Ivars C. Cintins
Attorney, Agent, or Firm—Oblon, Fisher, Spivak, McClelland & Maier

[57] ABSTRACT

An intermittent ozone feeding apparatus including an ozonier for producing ozonized oxygen, an adsorption-desorption tower for adsorbing ozone from the ozonized oxygen and desorbing the ozone with oxygen produced from adsorbing ozone in said adsorption-desorption tower being recycled to the ozonizer, adsorption-desorption tower being cooled during an ozone adsorption period and being heated at a temperature higher than that in the adsorption period during the ozone desorption period while the adsorption-desorption tower is subject to suction under a reduced pressure so as to desorb ozone wherein the sucking operation is maintained until the pressure on the suction side of the tower side is lower than that within the adsorption-desorption tower after the desorption period has been completed.

5 Claims, 16 Drawing Figures

INTERMITTENT OZONE FEEDING APPARATUS

BACKGROUND OF THE INVENTION

1. Field of the Invention

The present invention relates to an intermittent ozone feeding apparatus.

2. Description of the Prior Art

Ozone has a remarkable oxidizing effect and does not cause public polution. Accordingly, ozone has been used in various fields for environmental treatment and treatment in chemical industries. A continuous ozone treatment process and an intermittent ozone treatment process have been employed depending upon the purposes of application of ozone. An intermittent ozone treatment has been utilized for preventing deterioration of the functioning of a coolant water pipe equipped in instrumentation of a power plant, a chemical factory or a machining factory which is caused by adhesion of living organisms such as algae and shell-fish causing deterioration of the heat exchange efficiency and clogging of the pipe or for preventing various problems in a water quality tester or other instrument caused by adhesion of algae and shell-fish in a clean water passage or a waste water passage. In the treatment, ozone is intermittently fed one to several times for several minutes per feeding, each one to several days to inhibit propagation of the living organisms.

If an ozonizer is intermittently operated during the intermittent application of ozone, a large sized ozonizer is required, causing higher instrumention costs. Usually, an intermittent ozone feeding apparatus generates ozone by a smaller ozonizer which is stored in a silica gel at a low temperature for a relatively long time period (one to several days) and the ozone is desorbed once for several minutes to feed ozone into the water for treatment.

Figure 1A:
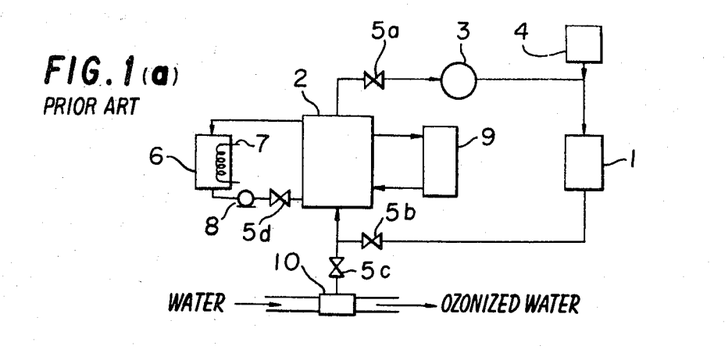
FIG. 1(a) is a schematic view of a conventional intermittent ozone feeding apparatus.
Figure 1B:
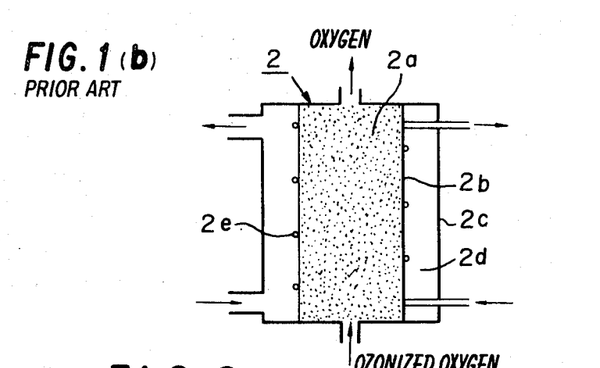
FIG. 1(b) is a vertical sectional view of the adsorption-desorption tower of FIG. (a)

FIG. 1(a) is a diagram of a conventional intermittent ozone feeding apparatus and FIG. 1 (b) is a sectional view of an adsorption-desorption tower taken along a perpendicular plane. In FIG. 1(a), reference number (1) designates an ozonizer; (2) designates an adsorption-desorption tower into which an ozonized oxygen is fed from ozonizer (1); (3) designates a recycling blower for recycling the oxygen from adsorption-desorption tower (2) to the ozonizer (1); (4) designates an oxygen feeding source to ozone generator (1); (5a) (5d) designate, respectively, electromagnetic valves; (6) designates a hot brine tank for receiving brine from the adsorption-desorption tower (2); (7) designates a heater equipped with the hot brine tank; (8) designates a pump for feeding the brine to adsorption-desorption tower (2); (9) designates a refrigerator for cooling adsorption-desorption tower (2); and (10) designates a water ejector for suction of ozone from adsorption-desorption tower (2).

In FIG. 1(b) reference number (2a) designates an ozone adsorbent packed in adsorption-desorption tower (2) and is usually made of silica gel. Reference number (2b) designates an inner column for holding the ozone adsorbent; (2c) designates an outer column; (2d) designates an adsorption-desorption brine tank formed between the inner column and the outer column; and (2e) designates an evaporation pipe which closely contacts with inner column (2b) and is connected to refrigerator (9).

The operation of the apparatus will now be discussed referring to the operation timing sequence shown in FIG. 2. The operation is classified into an ozone adsorption and an ozone desorption period. The arrowed lines indicate operation timings of the instruments. In the case of an electromagnetic valve, the arrowed line indicates the opening state.

The ozone adsorption process will now be described in detail. An oxygen recycling system is formed by ozonizer (1), the adsorption-desorption tower (2) and the recycling blower (3) in that order. Electromagnetic valves (5a), (5b) are opened and electromagnetic valves (5c), (5d) are closed. Oxygen is fed from oxygen feeding source (4) at a constant pressure (usually 2 ata) in the system. The ozonized oxygen formed by ozonizer (1) is fed into adsorption-desorption tower (2) for ozone to be adsorbed by ozone adsorbent (2a). Oxygen (95% or more) which is not ozonized by ozonizer (1) is recycled by recycling blower (3) into ozonizer (1) to form the oxygen recycling system. The tower is cooled to lower than $-30°$ C. by refrigerator (9) during the ozone adsorption period, since the amount of ozone adsorbed in the tower (2) is higher with respect to lowering of the temperature of the silica gel.

Usually, cooling is carried out by evaporating Freon compressed by refrigerator (9) in evaporation pipe (2e) which closely contact with inner column (2b). Thus, ozone is adsorbed in adsorption-desorption tower (2). When the concentration of ozone on ozone-adsorbent (2a) reaches a nearly saturated concentration after a predetermined time, leakage of ozone from the gas outlet of adsorption-desorption tower (2) is initiated. If the adsorption operation is continued after initiating the leakage of ozone, loss of electric power is caused. Therefore, the operation for adsorption is discontinued and desorption is started. The period for the desorption is for predetermined length of time.

The ozone desorption will now be described in detail. In desorption of ozone, electromagnetic valves (5a), (5b) are closed, electromagnetic valves (5c), (5d) are opened, water is fed into water ejector (10) to suck ozone under a reduced pressure from adsorption-desorption tower (2) and ozone is dissolved to obtain ozonized water. At the same time, pump (8) is actuated whereby brine is fed from hot brine tank (6) heated by heater (7) usually at 50° C. into adsorption-desorption brine tank (2d) and ozone adsorbent (2a) cooled during the operation for adsorption to the low temperature is heated to accelerate the desorption of ozone.

The operation for adsorption of ozone is performed during a relatively long period such as, for example, one to several days whereas the operation for desorption of oxygen is performed for a relatively short time of one to several minutes by heating under a reduced pressure in the adsorption-desorption tower (2). After desorption, the adsorption operation is started again by feeding oxygen into the system from oxygen feeding source (4) and cooling adsorption-desorption tower (2) by refrigerator (9).

In the conventional intermittent ozone feeding apparatus, when ozone is introduced into a water pipe system there is a possibility that the water will flow reversely so as to enter into adsorption-desorption tower (2) because tower (2) is desorbed at a reduced pressure (less than atmospheric pressure). If the water flows reversely into adsorption-desorption tower (2), the silica gel, having adsorbed a large amount of ozone and oxygen, undergoes an abrupt decomposition or desorption of ozone so as to possibly cause an explosion. Even if an explosion is not caused, it is necessary to replace the silica gel with new gel because moisturized silica gel can not adsorb ozone. Intermittent ozone feeding apparatuses are, therefore, needed to prevent the reverse flow of water into the adsorption-desorption tower (2).

Reverse-flow of water into the silica gel in the conventional apparatus and an attempt to prevent it will now be described with reference to FIGS. 1 to 3. In these figures, upon completion of ozone desorption period, the pressure in adsorption-desorption tower (2) is usually at 0.1 ata which provides a condition sufficient to cause a reverse flow of water in a water pipe during an oxygen packing period. The leakage of water can, however, be prevented if electromagnetic valve (5c) is closed. Since the conventional electromagnetic valve has a directional function which stops flow in one direction, two electromagnetic valves (5c1), (5c2) connected in an opposite direction are usually used. Electromagnetic valve (5c1) is mainly used for preventing leakage of the ozone and the oxygen out of the system during an ozone adsorption period and electromagnetic valve (5c2) is used for preventing leakage of the water (or air outside the system) in to tower (2) during the time period between completion of the ozone desorption period and filling of the system with oxygen. Conventional electromagnetic valve (5c) is normally of a non-leaking type electromagnetic valve which provides complete closing of the gas or liquid when closed and which is very expensive and has a short life span. Despite the use of two such electromagnetic valves (5c1), (5c2) to prevent reverse flow of the water into adsorption-desorption tower (2), there is still a risk of reverse flow of the water during the oxygen packing period in the operation timing sequence shown in FIG. 2 if the valve body of electromagnetic valve (5c) becomes clogged with foreign matter so as to prevent complete closing of the valve. During the ozone adsorption period which is a major portion of the operational time of the conventional apparatus, a water leaking condition is established so that water may enter into the silica gel even with little leakage.

Another problem exists with the conventional intermittent ozone feeding apparatuses. An oxygen receiver is normally used as an oxygen source (4) for a small sized apparatus. The receiver contains a water content of about 1000 ppm when the dew point of the oxygen is about −20° C. Almost all water is adsorbed by the silica gel packed in adsorption-desorption tower (2) since silica gel is a strong adsorbent. Thus, when the silica gel adsorbes water, the ozone adsorption capacity of the silica gel decreases and ozone is decomposed whereby the amount of adsorbed ozone, i.e. desorbed ozone decreases depending upon the adsorption of water. In the conventional apparatus, it is necessary to periodically replace the silica gel in order to obtain normal operation of the apparatus. This requires a great deal of labor and a high cost. It is also necessary to stop operation of the apparatus for several days in order to replace the silica gel. Furthermore, living organisms have been found on the inner surface of the pipes during discontinuation of operation.

SUMMARY OF THE INVENTION

It is therefore an object of the present invention to overcome the disadvantages of the conventional apparatuses and to provide an intermittent ozone feeding apparatus for eliminating reverse flow of water by maintaining a sucking operation even after completion of the desorbing operation until the pressure on the sucking side is lower than that of the adsorption-desorption tower.

Another object of the present invention is to provide an intermittent ozone feeding apparatus for eliminating reverse flow of water by connecting two electromagnetic valves opposite each other in a desorbed ozone passage which is provided between the adsorption-desorption tower and a suction part and to provide another valve connected in a passage communicating the two opposite electromagnetic valves thereby permitting flow of a fluid except during the ozone desorption period.

Still another object of the present invention is to provide an intermittent ozone feeding apparatus having a moisture removing tower at the outlet side in relation to an oxygen feeding source so as to eliminate the replacement of silica gel in the adsorption-desorption tower.

The foregoing and the other objects of the present invention have been attained by providing an intermittent ozone feeding apparatus including an ozonizer for producing ozonized oxygen from oxygen and an adsorption-desorption tower for adsorbing ozone from the ozonized oxygen and desorbing the ozone, oxygen resulted from the adsorbing ozone in the adsorption-desorption tower being returned to the ozonizer and the adsorption-desorption tower being cooled during an ozone adsorption period and being heated at a temperature higher than that in the adsorption period during the ozone desorption period while being sucked under a reduced pressure to desorb ozone wherein the sucking operation is maintained until the pressure on the sucking side is lower than that of the adsorption-desorption tower after the desorption period has been completed.

In another embodiment of the present invention, two electromagnetic valves are connected opposite each other in a passage for desorbed ozone between the adsorption-desorption tower and a suction part, flow passage is provided, one end thereof being connected to the passage between said electromagnetic valves and the other end being opened and within the flow passage, a valve is disposed so as to prevent a flow of fluid in the direction of the electromagnetic valves during the ozone desorption period and to permit fluid flow in the opposite direction during the remaining period.

In yet another embodiment of the present invention, the intermittent ozone feeding apparatus is provided with a moisture removing tower in the outlet passage in relation to an oxygen feeding source.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 4:
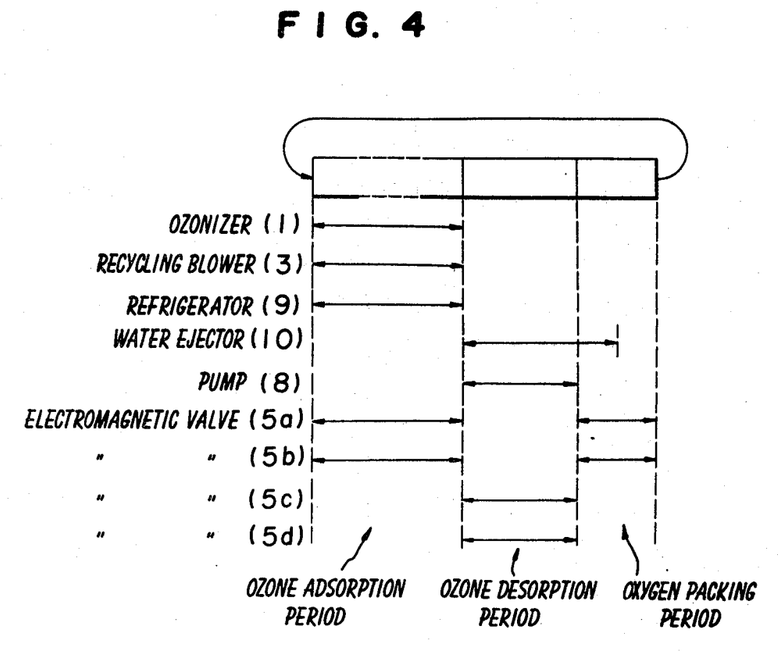
FIG. 4 is an operation sequence diagram of an embodiment of the intermittent ozone feeding apparatus of the present invention.

FIG. 4 shows the operation timing sequence of an embodiment of the intermittent ozone feeding apparatus of the present invention whose structure is substantially the same as that in FIG. 1. The difference in the timing sequence of FIG. 4 from that of FIG. 2 is that a water ejector (10) is operated beyond an ozone desorption period until adsorption-desorption tower (2) is filled with oxygen and the pressure in adsorption-desorption tower (2) is greater than the hydraulic pressure in water ejector (10).

Figure 2:
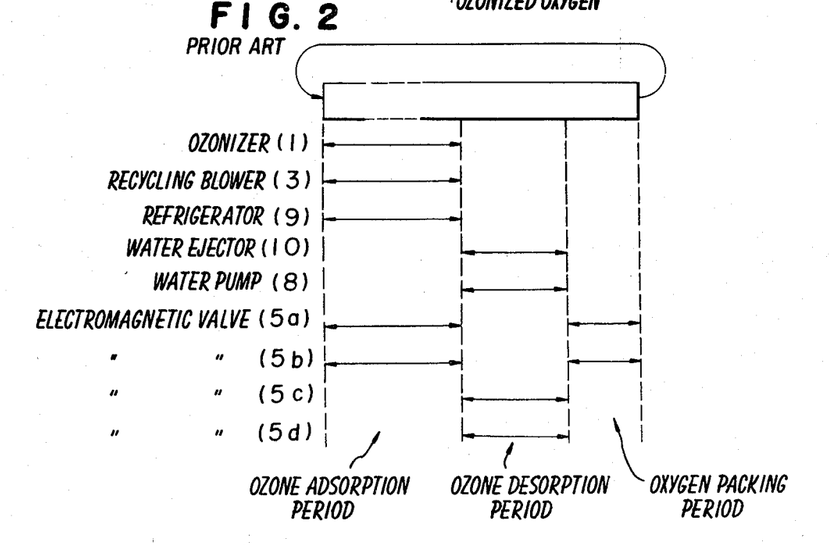
FIG. 2 is an operation sequence diagram of the apparatus shown in FIG. 1(a)
Figure 3:
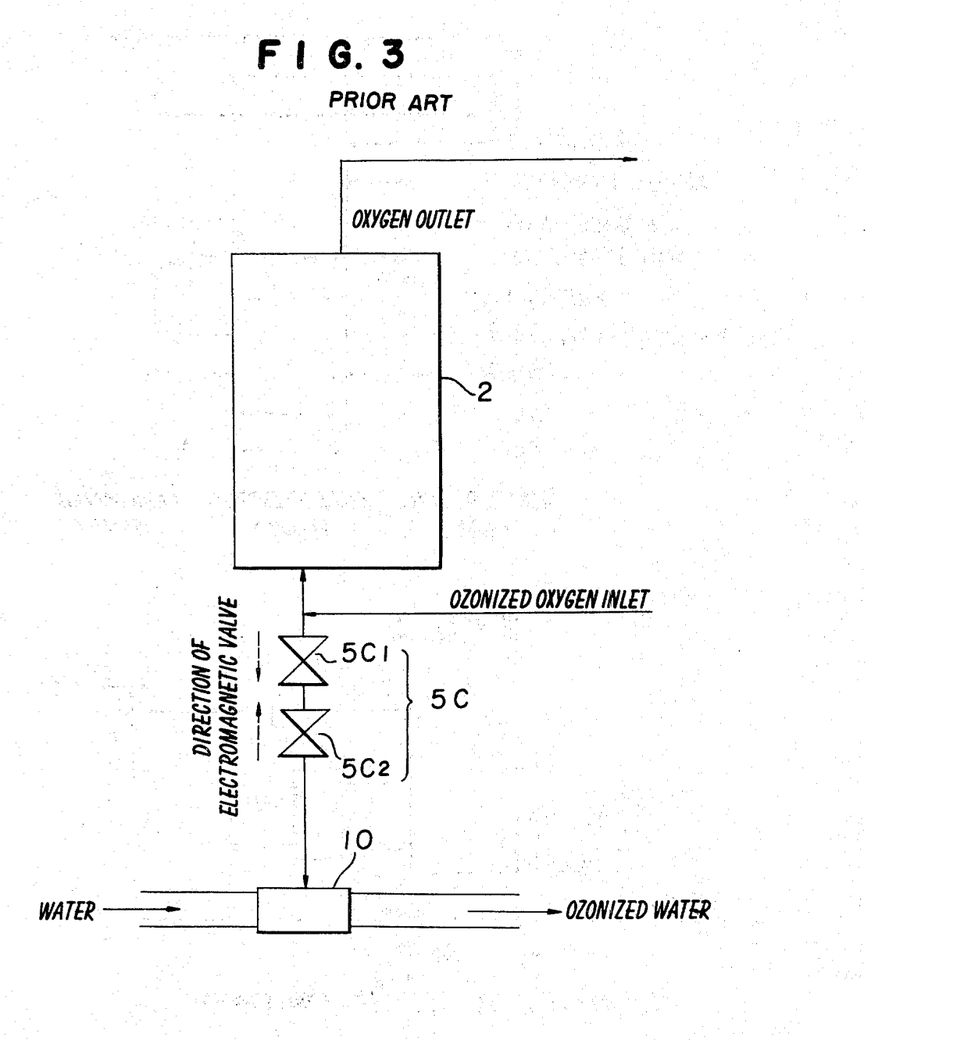
FIG. 3 is a schematic view showing the structure of an electromagnetic valve of the conventional apparatus of FIG. 1(a)

Operation of the intermittent ozone feeding apparatus having the structure described is basically the same as that shown in FIGS. 1 and 2 except that water ejector (10) operates until the adsorption-desorption tower (2) is packed with oxygen after the completion of the ozone desorption period and the pressure of oxygen in adsorption-desorption tower (2) is higher than the hydraulic pressure in water ejector (10). Reverse flow of water from water ejector (10) is prevented and thus there is no risk of reverse flow as was found in the conventional apparatuses. In this case, the flow from water ejector (10) to adsorption-desorption tower (2) is not specifically indicated.

Figure 5:
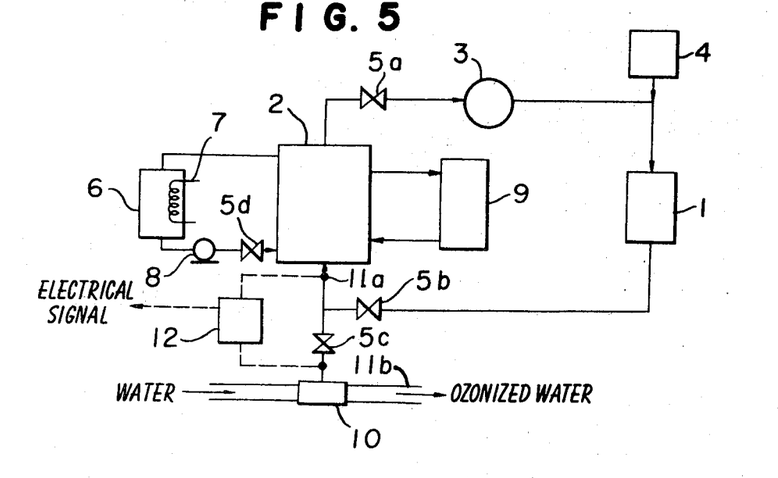
FIG. 5 is a block diagram of an embodiment of the present invention, such diagram showing a structure for determining discontinuation of the operation of a water ejector.

FIG. 5 is a schematic view of an embodiment of a part for determining the condition discontinuing a operation of water ejector (10) wherein reference number (11a) designates a pressure detector for detecting the pressure of adsorption-desorption tower (2); (11b) designates a pressure detector for detecting the hydraulic pressure of water ejector (10) and (12) designates a controller unit which detects difference of pressure between the two pressure detectors and generates an electric signal when the inner pressure of adsorption-desorption tower (2) is higher than the hydraulic pressure of water ejector (10).

The pressure respectively detected by pressure detectors (11a), (11b) are compared by controller unit (12) which generates an electric signal when the pressure detected by detector (11a) is higher than that detected by detector (11b) thereby stopping water ejector (10). In a case where the hydraulic pressure in the water piping system does not change, use of only one pressure detector (11a) is sufficient. A timer may be used to actuate water ejector (10) for a predetermined time after the ozone desorption period has finished if the rate of feeding oxygen is previously measured and the time in which the inner pressure of adsorption-desorption tower (2) reaches a predetermined value is obtained.

In the embodiment described above, the reduction in pressure or sucking of adsorption-desorption tower (2) is performed by water ejector (10). The same effect can be obtained by the use of a diaphragm or a vacuum pump. The types and structures utilized for ozonizer (1) and adsorption-desorption tower (2) can be also optional.

Figure 6:
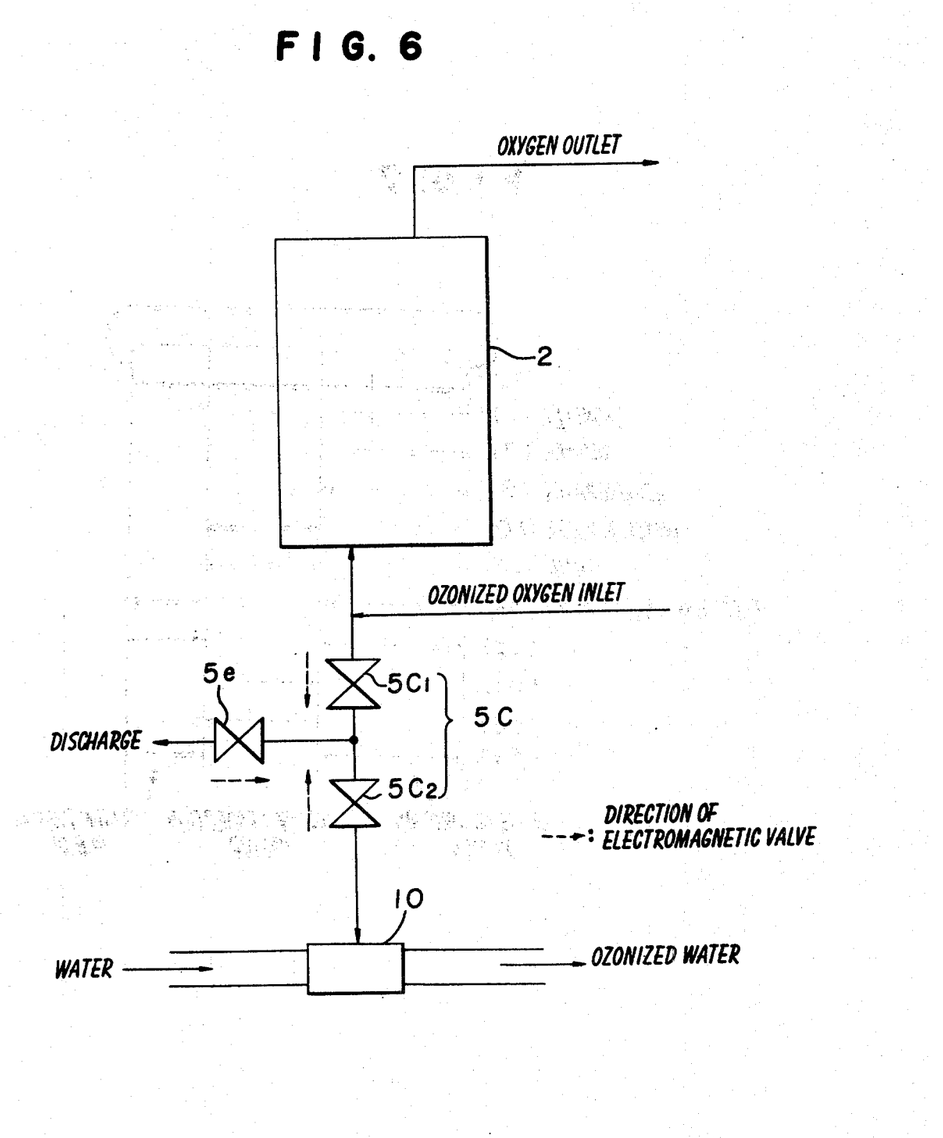
FIG. 6 is a schematic view of another embodiment of the intermittent ozone feeding apparatus of the present invention.

FIG. 6 is a schematic view of another embodiment of the intermittent ozone feeding apparatus of the present invention wherein reference numbers (2) to (10) designate the same parts as those in FIG. 1(a). Reference numbers (5c1) and (5c2) designate electromagnetic valves connected opposite each other in a passage for ozone desorbed in adsorption-desorption tower (2), these valves corresponding to valve (5c) in FIG. 1. Reference number (5e) designates an electromagnetic valve connected in a passage which communicates the intermediate portion of two valves (5c1), (5c2) with the open end so as to block the flow of fluid toward valves (5c1), (5c2). The other structure elements of this embodiment are the same as that of FIG. 1(a).

Figure 7:
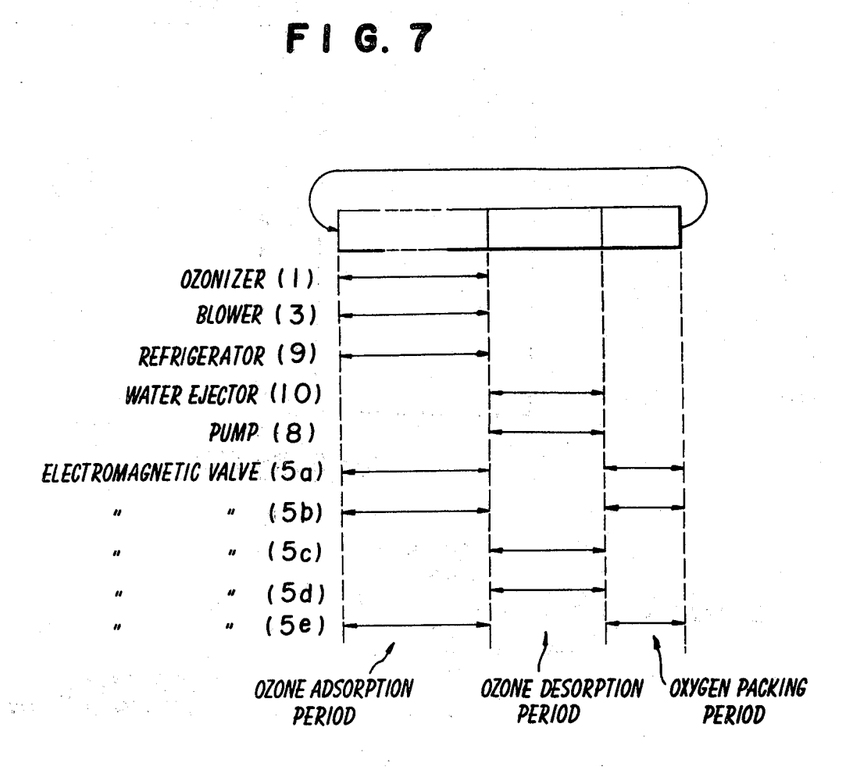
FIG. 7 is a sequence diagram of the embodiment of FIG. 6.

FIG. 7 is a diagram of the operation timing sequence of the intermittent ozone feeding apparatus shown in FIG. 6. The operation timing sequence is the same as that of FIG. 2 except that electromagnetic valve (5e) is in an opened state during periods other than the ozone desorption period.

In the structure utilized in this embodiment, electromagnetic valves (5c1), (5c2) are opened and electromagnetic valve (5e) is closed during the ozone desorption period but water is not then sucked from electromagnetic valve (5e). During a period other than the ozone desorption period, opposite valve conditions exist; water ejector (10) undergoes higher hydraulic pressure, and even leakage occurs in electromagnetic valve (5c2), leakage water being discharged out of the system because of electromagnetic valve (5e) being opened, thereby preventing water flowing into the adsorption-desorption tower (2).

In the conventional apparatus, a non-leaking type electromagnetic valve useful in providing complete-cutting off of gas or liquid has been used for electromagnetic valve (5c2). Such non-leaking valve is rather expensive and has a relatively short life span. In accordance with the structure of embodiment of the present invention, allowance of a little leakage occurs and a specially constructed electromagnetic valve is not required and accordingly, the manufacturing cost can be reduced.

Figures 8, 9:
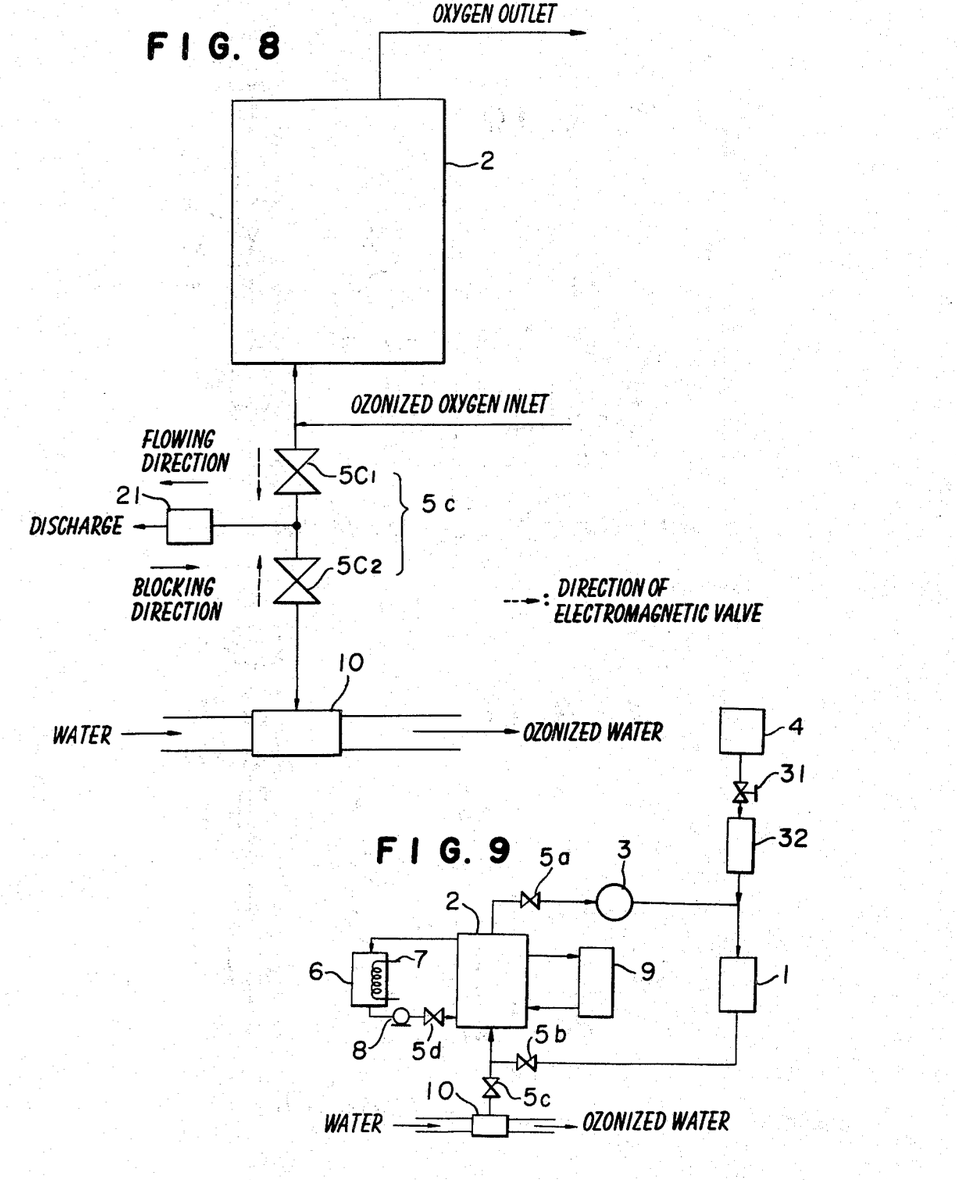
FIG. 8 is a schematic view of another embodiment of the present invention.
FIG. 9 is a schematic view of further embodiment of the present invention.

The same effect can be obtained by utilizing a check valve instead of electromagnetic valve (5e). FIG. 8 is a schematic view of another embodiment using a check valve (21). Check valve (21) allows the flow of fluid from the intermediate portion of electromagnetic valves (5c1), (5c2) toward the exterior of the system (the open end), that is, water leaking from electromagnetic valve (5c2) is discharged and prevents the flow of the fluid in the opposite direction, that is, environmental air is not sucked in during the ozone desorption period. Thus, check valve (21) has the same fuction as electromagnetic valve (5e) shown in FIG. 6. However, other valves if they have the same function can be employed. The types and the structures of ozonizer (1) and adsorption-desorption tower (2) are optional.

In accordance with the embodiment described above, water leaking from the electromagnetic valve (5e) during a period other than the ozone desorption period can be discharged out of the system and accordingly, even though the hydraulic pressure in the piping system for feeding ozone is greater than oxygen pressure (the pressure in the apparatus) during the ozone adsorption period, reverse flow of water can be prevented. The intermittent ozone feeding apparatus can be, therefore, operated safely thereby providing a remarkable effect.

Another embodiment of the intermittent ozone feeding apparatus of the present invention will now be described with reference to FIG. 9. FIG. 9 is a schematic view of the apparatus wherein reference numbers (1) to (11) designate the same or corresponding parts as those in FIG. 1(a). Reference number (32) designates a moisture removing tower connected downstream of a pressure regulator (31) in relation to oxygen feeding source (4) and packed with a moisture adsorbent such as active alumina, molecular sieve, etc. The operation timing sequence of the embodiment is the same as that of FIG. 2.

The operation of this embodiment having the structure described above is basically the same as that of FIG. 1(a) except for the provision of moisture removing tower (32) which removes water in oxygen fed from oxygen feeding source (4). This eliminates the replacement of silica gel because there is no substantial amount of water in the oxygen recycling system. The moisture adsorbent held in tower (32), however, loses its function when it has adsorbed a significant amount of water. Periodical replacement of the adsorbent is therefore needed. Use of a cassette type structure, for example, allows a short replacement time thereby eliminating the discontinuation of machine operation.

An additional effect, as stated below, can be obtained when moisture removing tower (32) is placed between the oxygen recycling system and pressure regulator (31) as shown in FIG. 9 and an adsorbent having ozone decomposing property such as active alumina or a molecular sieve (for example, 5A or 13X) is used. In the conventional apparatus shown in FIG. 1(a), ozone leaking from the adsorption-desorption tower (2) sometimes reaches an oxygen feeding point connected to the oxygen recycling system and the diffusion of the ozone may cause damage of pressure regulator (31). The conventional apparatus is, therefore, provided with a pressure regulator made of ozone-resistant material such as stainless steel or teflon. In the structure of the present invention as shown in FIG. 9, ozone entering into the oxygen feeding portion by diffusion is decomposed in moisture removing tower (32). It is thus no longer necessary to use pressure regulator (31) having ozone-resistant property thereby reducing a manufacturing cost of the apparatus.

Figure 10:
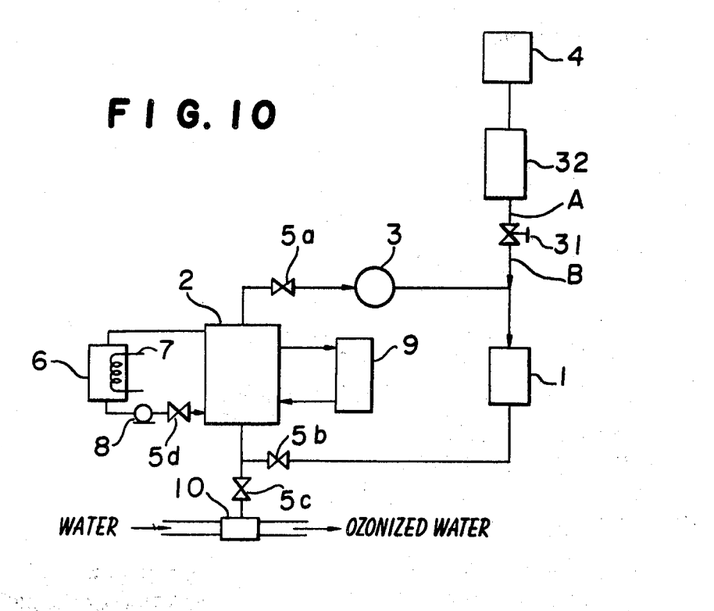
FIGS. 10 and 11 are respectively schematic views of a modification of the embodiment shown in FIG. 9.
Figure 11:
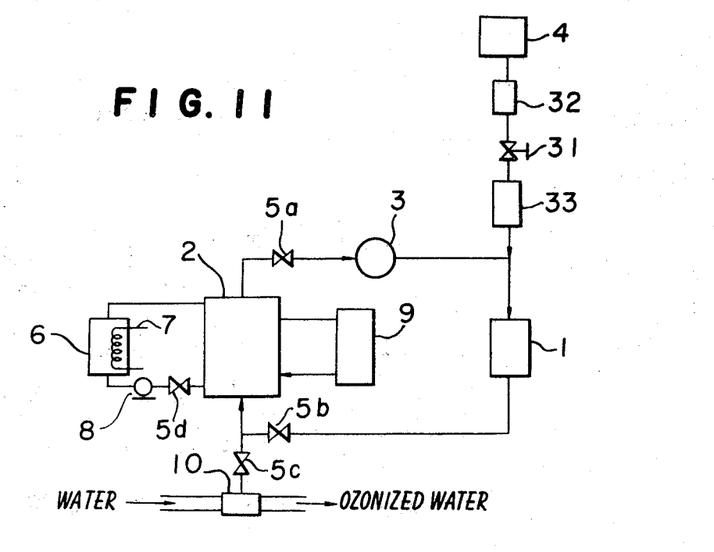

FIG. 10 shows another embodiment of the intermittent ozone feeding apparatus of the present invention wherein the same reference numbers designate the same or corresponding parts. In FIG. 10, moisture removing tower (32) is connected between oxygen feeding source (4) and pressure regulator (31). Pressure regulator (31) is so manufactured as to provide a primary pressure at the oxygen inlet side A higher than a secondary pressure at oxygen outlet side B. Moisture removing tower (32) is disposed on a higher pressure side. A moisture adsorbent can adsorb much water for each unit volume depending upon pressure increasing. The structure as shown in FIG. 10 provides a function to moisture removing tower (32) greater than that in FIG. 9. The former also provides a life span (a period in use) longer than the latter. In this case, if pressure regulator (31) is not of an ozone-resistant material, a decomposing tower (33) used only for decomposing ozone may be connected between pressure regulator (31) and the oxygen recycling system as shown in FIG. 11. Decomposing tower (33) can be as described above which is packed with the active alumina or the molecular sieves. The adsorbent held in the decomposing tower 33 is not required to be replaced because it does not adsorb water.

The type and the structure of the moisture removing tower is not critical and the adsorbent can be one without an ozone adsorbing function but instead water adsorbing such as potassium chloride. The types and specific structure of ozonizer (1) and the adsorption-desorption tower are also optional.

In accordance with the embodiment of the present invention, a moisture removing tower is provided downstream of an oxygen feeding source so as to remove moisture in the oxygen whereby silica gel in the adsorption-desorption tower does not become wet. It is unnecessary to replace the silica gel and thus the cost of and labor for the replacement can be eliminated.

Figure 15:
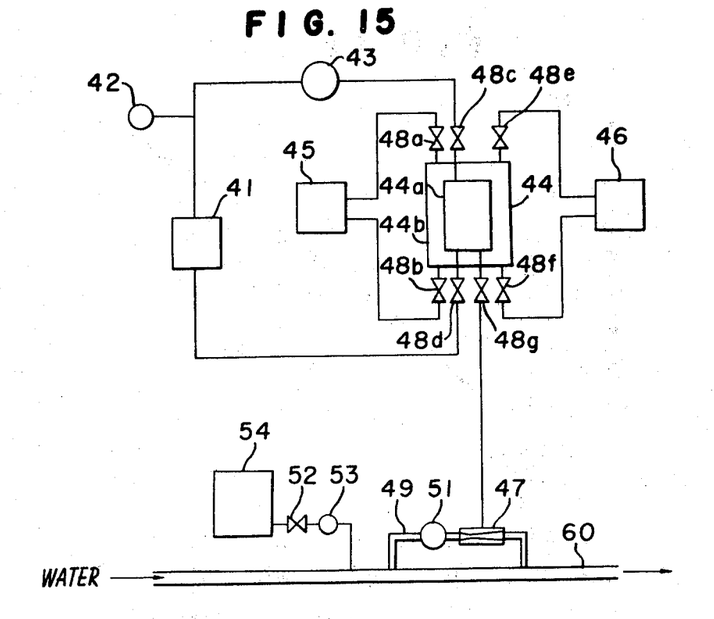
FIG. 15 is a schematic view of an embodiment of the slime controlling apparatus of the present invention.

FIG. 15 is a schematic view of still another embodiment of the present invention in which a bromide ion feeding device is provided. In the conventional ozone feeding apparatuses, ozone dissolved in water tends to escape from the discharge port of a water pipe in atmosphere. Ozone has a relatively short life in water and easily decomposes into oxygen whereas it has a relatively long life in air. It is therefore necessary to prevent as much as possible the escape of ozone into the atmosphere. The embodiment as shown in FIG. 15 has been attained by discovery of the fact that ozone reacts mildly with bromide ion and the reactant has a bacteriocidal effect.

Figure 12:
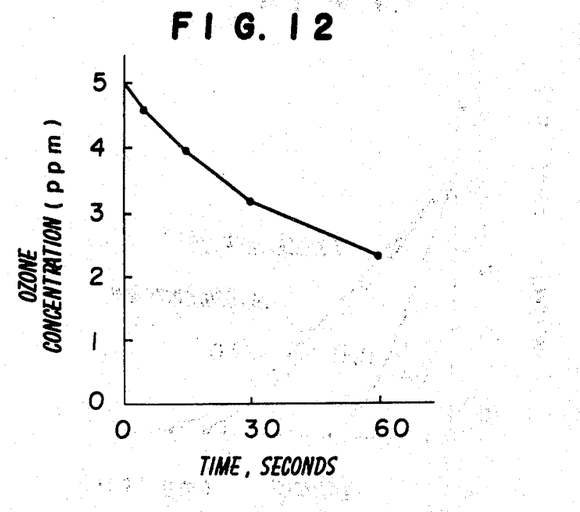
FIG. 12 is a diagram showing ozone decomposition characteristic in the presence of bromide ion.
Figure 13:
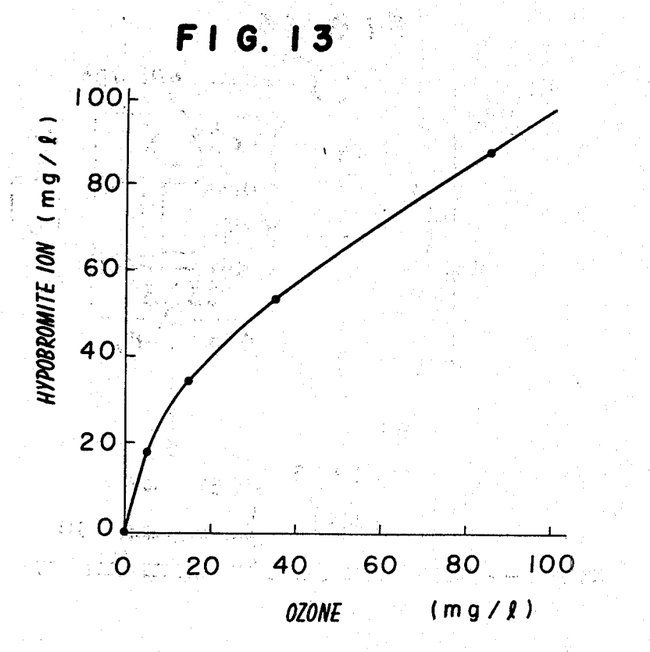
FIG. 13 is a diagram showing the relation between ozone fed into an ozonizer and resulting hypobromous acid ion.
Figure 14:
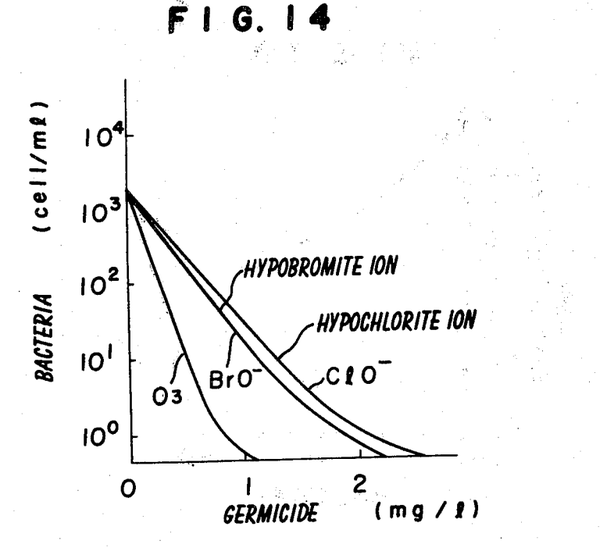
FIG. 14 is a diagram showing the bacteriocidal effect of various germicides.

The embodiment in FIG. 15 will now be described in detail. FIG. 15 shows an ozone decomposition curve obtained by adding 5 ppm ozone into water (pH=7) containing 8 ppm bromide ion. FIG. 12 shows that ozone is rather mildly reduced. On the other hand, it is considered that ozone reacts with bromide ion to produce hypobromite ion. FIG. 13 is a diagram of relation between hypobromite ion and ozone which is obtained by extracting ozone dissolved in water by periodical aeration and testing the residual hypobromite ion by iodometry. FIG. 13 shows that the production of hypobromite ions increase depending upon consumption of ozone. FIG. 14 is a diagram showing the bacteriocidal effects of hypobromite ion, hypochlorite ion and ozone to bacteria. FIG. 14 shows that the hypobromite ion has the same bacteriocidal effect as the hypochlorite ion even though the former has a lower effect than ozone.

The embodiment as shown in FIG. 15 utilizes the bacteriocidal effect of hypobromite ions to prevent the escape of ozone by reacting bromide ions fed from a bromide ion feeding device with ozone to produce hypobromite ions.

In FIG. 15, reference number (41) designates an ozonizer, (42) an oxygen feeding source, (43) a blower, (44) an adsorption-desorption tower, (45) a refrigerator, (46)

a heater, (47) a water ejector, (48a) to (48f) switching valves, (51) a pump for driving the water ejector connected to a branched water pipe (49) which is, in turn, connected to a water pipe (60) for cooling. A bromide ion feeding device includes a bromide ion tank (54), an electromagnetic valve (52) and a metering pump (53) for feeding bromide ion from the tank (54) through the valve (52) to the pipe (60) for cooling.

Operation of this embodiment will now be described in detail. When an adsorbent held in adsorption-desorption tower (44) adsorbs ozone to reach its saturated adsorbing state, switching valves (48a) to (48d) are closed, valves (48e) and (48f) are opened and the heater (46) is actuated, thus switching the apparatus to desorption operation. Then, ejector-driving pump (51) and electromagnetic valve (52) are actuated and metering pump (53) is also actuated to feed bromide ion into water pipe (60) while switching valve (48g) is opened to eject ozone into water pipe (60). In the water pipe, ozone reacts with bromide ions to produce hypobromite ions which are useful in preventing the deposition of living organisms on the inner surface of the water pipe. When the ozone desorption period is completed, electromagnetic valve (52) and metering pump (53) are deactuated to cease the feeding of bromide ions and switching valves (48e), (48f), (48g) are closed and the operation of ejector-driving pump (51) is discontinued. Thus, the ozone adsorption period is started.

The structure of the bromide ion feeding device shown in FIG. 15 is not critical but can be optional and the structure and type of the electromagnetic valve (52) and the metering pump (53) are also optional.

In accordance with this embodiment of the present invention, water containing bromide ions is fed at the same time of ozone feeding whereby only gas to the exclusion of ozone is discharged from the discharge port of a water pipe so as to prevent the discharge of ozone in air. At this point, discharging of ozone in air caused by the shortage of bromide ion fed into the water pipe and increase of the cost of bromide ions caused by excessive feeding can be controlled by feeding a predetermined amount of bromide ions suitable to react with ozone. Hypobromite ions produced by reacting the bromide ion with ozone has a bacteriocidal effect which controls the adhesion of living organisms on the water pipe.

Obviously, numerous modifications and variations of the present invention are possible in light of the above teachings. It is therefore to be understood that within the scope of the appended claims, the invention may be practiced otherwise than as specifically described herein.

WHAT IS CLAIMED AS NEW AND DESIRED TO BE SECURED BY LETTERS PATNET OF THE UNITED STATES IS:

1. An intermittent ozone feeding apparatus comprising:
   oxygen feeding means;
   an ozonizer for producing ozonized oxygen from said oxygen feeding means;
   an adsorption-desorption tower for adsorbing ozone from said ozonized oxygen and desorbing said ozone;
   means for recycling oxygen produced by adsorbing ozone in said adsorption-desorption tower to said ozonizer;
   suction means for applying suction under a reduced pressure to desorb ozone from said adsorption-desorption tower;
   passage means for desorbed ozone interconnecting said adsorption-desorption tower and said suction means;
   means for cooling said adsorption-desorption tower during an ozone adsorption period;
   means for heating said adsorption-desorption tower during an ozone desorption period at a temperature higher than that occurring during the adsorption period;
   flow passage means having a first end connected to said passage means and a second opened end;
   first and second electromagnetic valves positioned in said passage means;
   valve means mounted in said flow passage means intermediate said first and second electromagnetic valves for preventing the flow of fluid in the direction of said first and second electromagnetic valves during the ozone desorption period and for permitting flow of fluid in an opposite direction during the ozone adsorption in said adsorption-desorption tower; and
   pressure detecting means positioned in and operatively associated with said passage means for discontinuing operation of said suction means when the pressure of said adsorption-desorption tower becomes higher than that within said suction means upon completion of said desorption and for preventing reverse flow of fluid during the ozone adsorption into said adsorption-desorption tower.

2. An apparatus according to claim 1, wherein said pressure detecting means for discontinuing operation further comprises a pressure detector for detecting pressure in said suction means, a pressure detector for detecting pressure in said adsorption-desorption tower, and signal generating means for generating a signal when the pressure of said adsorption-desorption tower is higher than in said suction means.

3. An intermittent ozone feeding apparatus comprising:
   oxygen feeding means;
   an ozonizer for producing ozonized oxygen from said oxygen feeding means;
   an adsorption-desorption tower for adsorbing ozone from said ozonized oxygen and desorbing said ozone;
   means for recycling oxygen produced by adsorbing ozone in said adsorption-desorption tower to said ozonizer;
   suction means operatively connected to said adsorption-desorption tower for applying suction under a reduced pressure to desorb ozone from said adsorption-desorption tower;
   means for cooling said adsorption-desorption tower during an ozone adsorption period;
   means for heating said adsorption-desorption tower during an ozone desorption period at a temperature higher than that occurring during the adsorption period;
   passage means for desorbed ozone interconnecting said adsorption-desorption tower and said suction means;
   first and second electromagnetic valves positioned in said passage means;
   flow passage means having a first end connected to said passage means and a second opened end; and valve means mounted in said flow passage means intermediate said first and second electromagnetic valves for preventing the flow of fluid in the direction of said first and second electromagnetic valves during the ozone desorption period and for permitting flow of fluid in an opposite direction during the ozone adsorption in said adsorption-desorption tower.

4. An apparatus according to claim 3, wherein said valve means further comprises means for opening said valve means except during the ozone desorption period.

5. An apparatus according to claim 3, wherein said valve means further comprises check valve means.

* * * * *